US009416512B2

(12) United States Patent
Suver

(10) Patent No.: US 9,416,512 B2
(45) Date of Patent: Aug. 16, 2016

(54) APPARATUS AND METHODS FOR THE PLACEMENT OF PIPE PILING

(71) Applicant: American Piledriving Equipment, Inc., Kent, WA (US)

(72) Inventor: Paul W. Suver, Seattle, WA (US)

(73) Assignee: American Piledriving Equipment, Inc., Kent, WA (US)

( * ) Notice: Subject to any disclaimer, the term of this patent is extended or adjusted under 35 U.S.C. 154(b) by 0 days.

(21) Appl. No.: 14/820,478

(22) Filed: Aug. 6, 2015

(65) Prior Publication Data

US 2015/0345095 A1    Dec. 3, 2015

Related U.S. Application Data

(62) Division of application No. 13/594,839, filed on Aug. 26, 2012.

(60) Provisional application No. 61/528,116, filed on Aug. 26, 2011, provisional application No. 61/660,292, filed on Jun. 15, 2012.

(51) Int. Cl.
| *E02D 7/18*  | (2006.01) |
| *E02D 7/22*  | (2006.01) |
| *E02D 7/26*  | (2006.01) |
| *E02D 5/52*  | (2006.01) |
| *E02D 11/00* | (2006.01) |
| *E02D 5/34*  | (2006.01) |
| *E02D 5/50*  | (2006.01) |
| *E02D 5/56*  | (2006.01) |
| *E02D 5/66*  | (2006.01) |

(Continued)

(52) U.S. Cl.
CPC ........ *E02D 5/526* (2013.01); *E02D 5/20* (2013.01); *E02D 5/285* (2013.01); *E02D 5/32* (2013.01); *E02D 5/34* (2013.01); *E02D 5/50* (2013.01); *E02D 5/56* (2013.01); *E02D 5/665* (2013.01); *E02D 7/06* (2013.01); *E02D 7/18* (2013.01); *E02D 7/22* (2013.01); *E02D 7/26* (2013.01); *E02D 11/00* (2013.01)

(58) Field of Classification Search
CPC ........... E02D 5/56; E02D 27/12; E02D 5/285; E02D 5/52
USPC ......... 405/232, 257, 286, 293, 305, 229, 231, 405/249, 250, 251, 252.1
See application file for complete search history.

(56) References Cited

U.S. PATENT DOCUMENTS 51,801  A  *  1/1866  Castle .................... E21B 7/00
                                                    166/243
234,151 A  * 11/1880  Vaughn ................... E21B 7/00
                                                    175/23

(Continued)

FOREIGN PATENT DOCUMENTS

GB          2 267 926        12/1993

*Primary Examiner* — Benjamin Fiorello
*Assistant Examiner* — Edwin Toledo-Duran
(74) *Attorney, Agent, or Firm* — Madson IP, P.C.

(57) ABSTRACT

Apparatus and methods for the installation of pipe pilings into the ground for use as structural building foundations, geothermal piles, or both, are disclosed. In addition to specialized fittings for pipe pile assemblies, the inventions include specialized drive mechanisms used in conjunction with rotary or vibratory motors. Methods of installing pipe pilings are further improved with the disclosure of methods of adding grout or similar materials during or after installation of the piles.

15 Claims, 8 Drawing Sheets

(51) Int. Cl.
  *E02D 5/20* (2006.01)
  *E02D 5/32* (2006.01)
  *E02D 7/06* (2006.01)
  *E02D 5/28* (2006.01)

(56) References Cited

U.S. PATENT DOCUMENTS

| | | | | |
|---|---|---|---|---|
| 872,093 A * | 11/1907 | Stewart | ............... | E21B 25/02 175/236 |
| 1,969,251 A * | 8/1934 | Bald | ............... | E02D 5/72 175/23 |
| 3,354,657 A * | 11/1967 | Turzillo | ............... | E02D 5/62 405/244 |
| 3,628,337 A * | 12/1971 | Stepanich | ............... | E02D 5/54 254/41 |
| 3,894,589 A * | 7/1975 | Ciraud | ............... | A01G 17/16 111/114 |
| 4,426,175 A * | 1/1984 | Lin | ............... | E02D 3/12 405/237 |
| 4,668,119 A | 5/1987 | Galletti | | |
| 4,708,530 A * | 11/1987 | Faber | ............... | B28B 21/42 405/245 |
| 5,002,435 A | 3/1991 | Dupeuble | | |
| 5,088,681 A * | 2/1992 | Procaccianti | ............... | E04H 12/2223 248/156 |
| 5,257,559 A * | 11/1993 | Cannetti | ............... | B25B 5/147 81/445 |
| 5,683,207 A * | 11/1997 | Mauer | ............... | E02D 27/16 405/231 |
| 5,833,399 A * | 11/1998 | Bullivant | ............... | E02D 5/385 405/233 |
| 5,904,447 A * | 5/1999 | Sutton | ............... | B09C 1/00 175/323 |
| 5,927,905 A * | 7/1999 | van Halteren | ............... | E02D 5/80 405/241 |
| 6,341,614 B1 * | 1/2002 | Tucker | ............... | A45B 3/00 135/66 |
| 6,386,295 B1 * | 5/2002 | Suver | ............... | E02F 3/962 173/1 |
| 6,652,195 B2 * | 11/2003 | Vickars | ............... | E02D 5/36 175/262 |
| 6,814,525 B1 * | 11/2004 | Whitsett | ............... | E02D 5/38 405/233 |
| 6,820,379 B1 * | 11/2004 | Krinner | ............... | E04H 12/2223 108/156 |
| 6,824,331 B2 * | 11/2004 | Parker | ............... | E02D 5/801 175/388 |
| 6,942,430 B1 * | 9/2005 | Suver | ............... | E02D 5/56 405/232 |
| 7,004,683 B1 * | 2/2006 | Rupiper | ............... | E02D 5/56 405/229 |
| 7,731,454 B1 * | 6/2010 | Watson, III | ............... | E02D 5/56 405/231 |
| 7,950,876 B2 | 5/2011 | Suver | | |
| 8,602,689 B1 * | 12/2013 | Van Polen | ............... | E02D 7/28 175/23 |
| 8,888,413 B2 * | 11/2014 | Seider | ............... | E02D 5/523 405/229 |
| 9,068,318 B1 * | 6/2015 | Gochis | ............... | E02D 5/56 |
| 2006/0127188 A1 * | 6/2006 | Francis | ............... | E02D 5/56 405/231 |
| 2007/0231081 A1 * | 10/2007 | Gantt | ............... | E02D 5/80 405/244 |
| 2010/0098502 A1 * | 4/2010 | Suver | ............... | E02D 5/38 405/272 |
| 2010/0319272 A1 * | 12/2010 | Kellner | ............... | E02D 5/801 52/157 |
| 2011/0158752 A1 | 6/2011 | Hitchin | | |

* cited by examiner

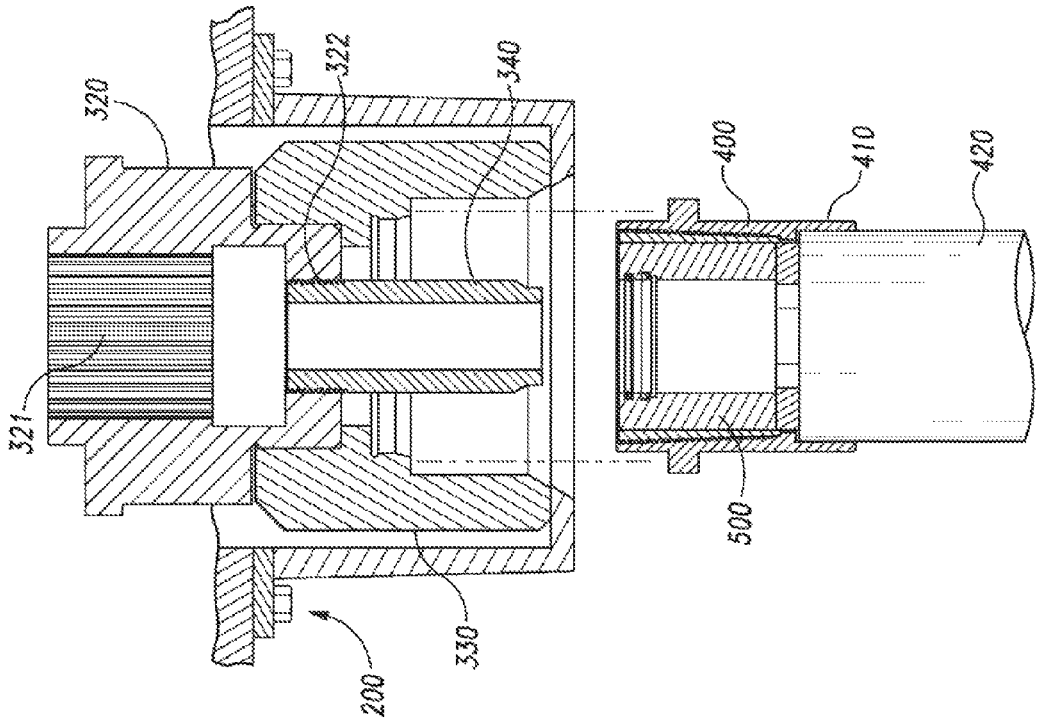
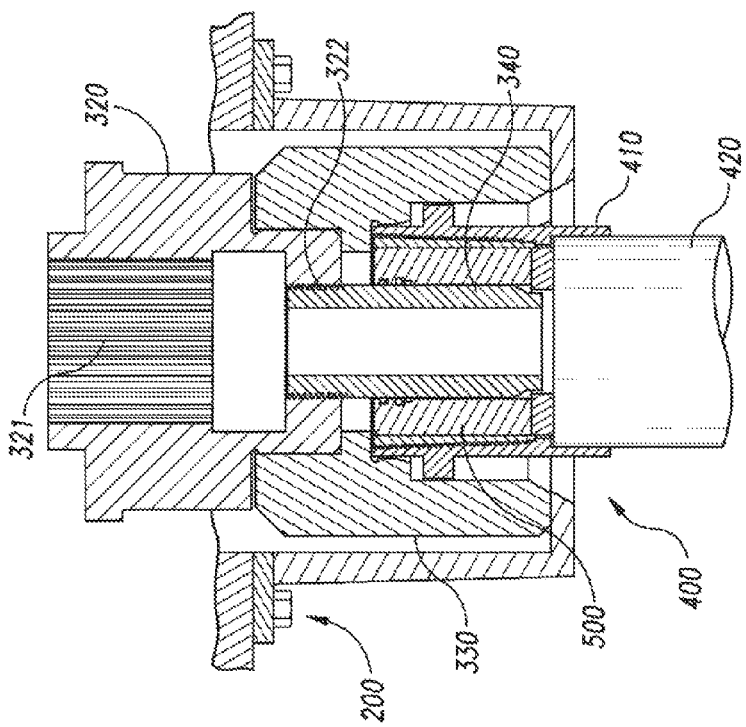

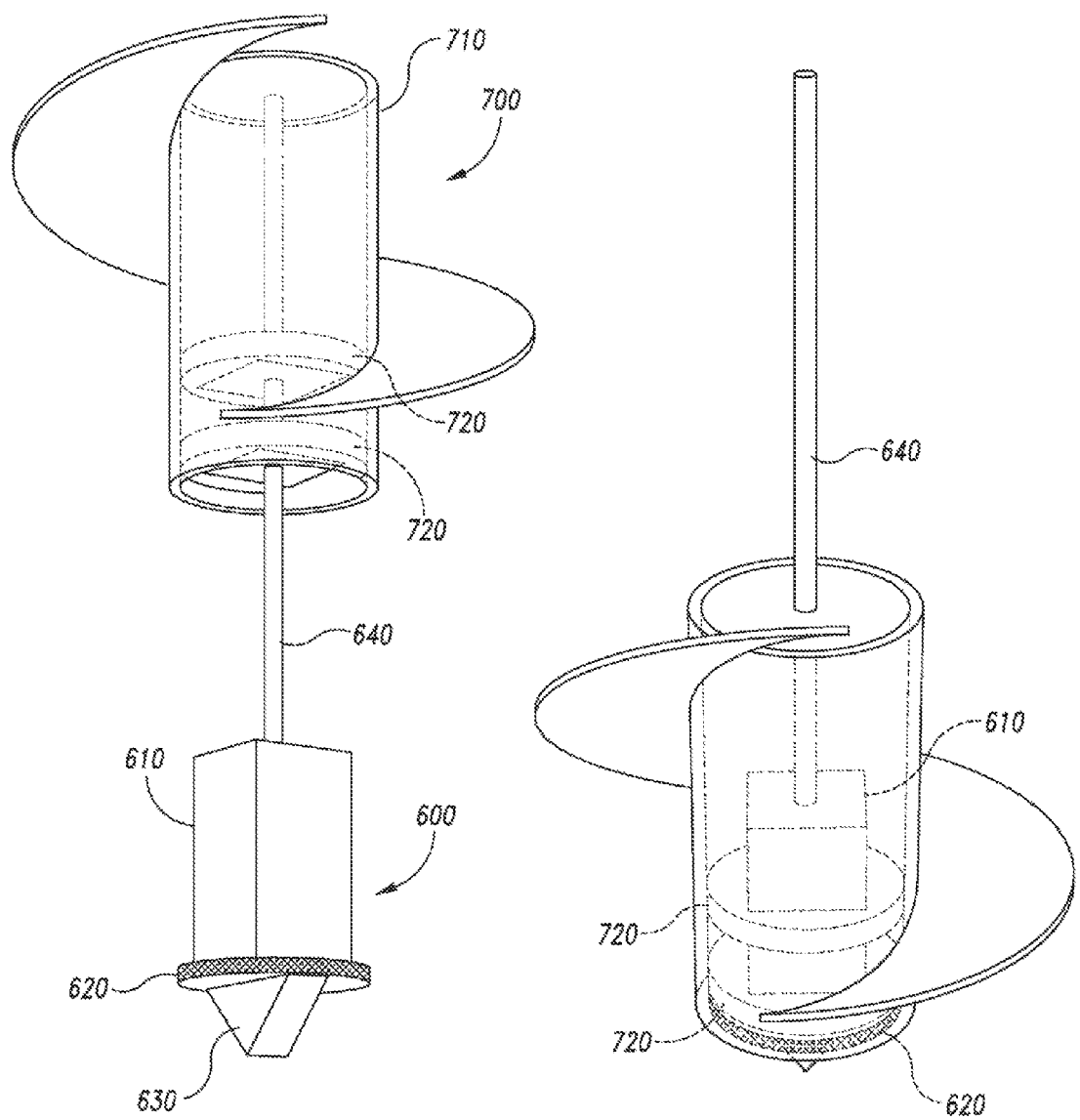

APPARATUS AND METHODS FOR THE PLACEMENT OF PIPE PILING

RELATED APPLICATIONS

This application is a division of U.S. patent application Ser. No. 13/594,839, filed Aug. 26, 2012 (hereinafter referred to as "Parent '839"). Parent '839 claims the benefit of priority to U.S. Provisional Patent No. 61/528,116, filed Aug. 26, 2012, and U.S. Provisional Patent Application No. 61/660,292, filed Jun. 15, 2012, which are incorporated by reference as if fully set forth herein. This application is related to U.S. Pat. No. 6,386,295 filed Mar. 10, 2000; U.S. Pat. No. 6,942,430 filed Mar. 10, 2004; and U.S. Pat. No. 7,950,876 filed Oct. 21, 2008, and all three patents are hereby incorporated by reference as if fully set forth herein.

FIELD OF THE DISCLOSURE

This disclosure relates to the placement of pilings, and in particular pipe pilings, in the ground to act as structural building foundations, geothermal piles, or both. In addition to specialized fittings for pipe pile assemblies, the disclosure includes specialized drive mechanisms used in conjunction with rotary or vibratory motors. Methods of installing pipe pilings are improved with the disclosure of methods of adding grout or similar materials during or after installation of the piles.

BACKGROUND OF THE DISCLOSURE

U.S. Pat. Nos. 6,386,295 and 6,942,430, which are incorporated here by reference, disclosed the use of vibratory and rotary drivers for the installation of pipe piling. Pipe piles, as used in the installation of structural foundations or geothermal piles, are segments of pipe that must be connected and driven together from the surface to reach the desired depth. Consequently, whether used in connection with vibratory or rotary drivers, the connection between pipe pile segments is vitally important to maximizing the driving power and reducing wear and tear in the pipe segment connection points. As the length of the column increases, weaknesses in the junctions between the pipe pile segments weaken the entire column, making it important to limit movement in the junctions.

Thus prior art methods that require the use of bolts through pipe pile and connectors increase the wear on the piles and the fasteners as some of the power from the drivers is transferred inefficiently through such joints. U.S. Pat. Nos. 6,386,295 and 6,942,430 disclosed pipe pile coupling mechanisms that may render the use of fasteners unnecessary, however, the force applied to the coupled joint through threading also created wear in the coupler and the pipe pile due to over threading or thread damage.

While it is generally acknowledged that installation of pipe piling is improved in stability and/or strength when installed with grout or similar material along the exterior of the column, prior art methods, including those disclosing push-out tips, are limited by the actual ability to push out the tip at the bottom of the column, or by difficulty in handling the grout during installation.

The citation of documents herein is not to be construed as reflecting an admission that any is relevant prior art. Moreover, their citation is not an indication of a search for relevant disclosures. All statements regarding the date(s) or contents of the documents is based on available information and is not an admission as to their accuracy or correctness.

BRIEF SUMMARY OF THE DISCLOSURE

The disclosure relates to methods of installing pipe pile assemblies that use special couplers, as well as removable fittings during the installation process. Drive shaft assemblies that transfer power from the motor to the pipe pile assemblies are disclosed that improve the installation process The disclosure relates to methods of installing pipe pile assemblies that use special couplers, as well as removable fittings during the installation process. Drive shaft assemblies that transfer power from the motor to the pipe pile assemblies are disclosed that improve the installation process.

In a first aspect, the disclosure includes a drive shaft assembly for driving pipe piles that includes a rotary output shaft, a rotary output member and a rotary socket wrench attachment. The rotary output shaft receives power from the driver motor, which is transferred to the rotary output member through mating splines. The rotary output member includes an external head that mates with the rotary socket wrench to transfer power to the socket wrench, which in turn includes internal socket wrench flats that are designed to mate with the pipe pile assembly. A removable grout tube may be used to facilitate the introduction of grout or other materials into the pipe piles.

In a second aspect, the disclosure includes coupler that is an open cylinder with an internal stop ring dividing a threaded from an unthreaded portion, and an external ring that is configured to receive a socket such as that of the rotary socket wrench attachment. In one embodiment, the coupler is used to connect pipe piles. In another embodiment, the coupler is attached to the top of a pile, and the external ring is fitted to the socket of a drive mechanism so that the pipe pile assembly is driven through that attachment. In yet another embodiment, the coupler as attached to the top of a pile includes a removable fitting in the threaded portion during the driving and installation process.

In an additional aspect, the disclosure includes a pipe pile assembly that comprises a pipe pile and a coupler attached to the top of the pile. In one embodiment, this assembly is the bottommost pipe pile in the column. In another embodiment, this assembly is the topmost pipe pile in a column, or the assembly being driven into the ground. In yet another embodiment, the assembly is one of many within the pipe piling column.

In another aspect, the disclosure includes a pipe pile assembly that includes a pipe pile and a coupler attached to the top of the pile and a second pipe pile with threaded bottom portion that can be threaded into the top of the coupler.

An additional aspect of the disclosure includes a pipe pile assembly that includes a pipe pile with a top and a bottom, where the bottom is configured to receive a removable tip insert. The tip insert includes a rod section connected to the tip insert. Additional rod sections can be connected to the rod and used to remove the tip insert during or after installation.

One aspect of the disclosure includes a plug assembly that fits into the threaded portion of a coupler. The assembly includes an externally threaded sleeve with a central opening, and a disk-shaped spacer that is fixed to the bottom of the sleeve with an opening aligned with the opening in the sleeve. The opening in the spacer is used to insert and remove the assembly from coupler. One or more additional sleeves can be used within the threaded sleeve as part of the plug assembly. The plug assembly can be used during installation to facilitate the introduction of grout or other material into the interior of the pipe piling, and may be used with the disclosed grout tube.

In a further aspect, the disclosure includes methods for installing pipe piling that includes driving a pipe pile assembly, coupling a pipe pile section to the driven assembly and driving the connected pile assembly. The steps are repeated until the target length of the column, or target depth of the driven column, is achieved.

In some embodiments, the method includes the driving of a first pipe pile assembly having a tip insert with a rod. In additional embodiments, additional rod sections can be added as piles are added, and the rod sections may be linked by the use of a connector. When the target length of the column and rod assembly is achieved, the motor may be used to reverse the column, creating a space between the bottom of the column and the earth. The rod sections may be used to push out the tip insert, during or after which grout is introduced to the earth through the column. The column is then driven back to its target depth.

In further embodiments, the disclosure includes methods for installing pipe piling that includes driving a pipe pile assembly, coupling a pipe pile section to the driven assembly and driving the connected pile assembly. The steps are repeated until the target length of the column, or target depth of the driven column, is achieved. The pipe piles may include plugged holes, and introduction of grout into the pile assembly may push out the plugs. In some cases, the embodiment may be practiced with the use of tip insert in the bottommost pipe pile together with rod sections.

An additional aspect of the disclosure is a method for installing pipe piling that includes driving a pipe pile assembly, with a grout plug assembly inserted into the coupler. Grout is introduced into the pipe pile through the grout plug assembly, which is then removed. A next pipe pile assembly is threaded into the coupler in place of the grout plug assembly, and the entire assembly is driven. Steps for repeating installation of grout, section by section, are contemplated.

In some embodiments, the apparatus and methods of the disclosure are practiced in relation to helical piles. In other embodiments, non-helical piles may be used. The piles may be painted or coated to facilitate installation or grouting applications.

In further embodiments, the apparatus and methods of the disclosure are practiced with piles that may include holes in the body of the pile. The holes may be plugged with cork or other removable objects. The plugs may be pushed out by material introduced into the pipe piles, such as grout.

In alternative embodiments, the apparatus and methods of the disclosure are practiced with piles that include external ports for the introduction of grout or other material. The ports may be used to introduce material during or after installation of one pile, or the entire pile assembly.

BRIEF DESCRIPTION OF THE FIGURES

FIGS. 7 and 8 illustrate the insertion of the pipe pile assembly, fitted with the grout plug assembly, into the drive shaft assembly.

FIGS. 11 and 12 illustrate the tip insert and the bottom of the pipe pile into which the tip insert.

DETAILED DESCRIPTION OF MODES OF PRACTICING THE DISCLOSURE

Figure 1:
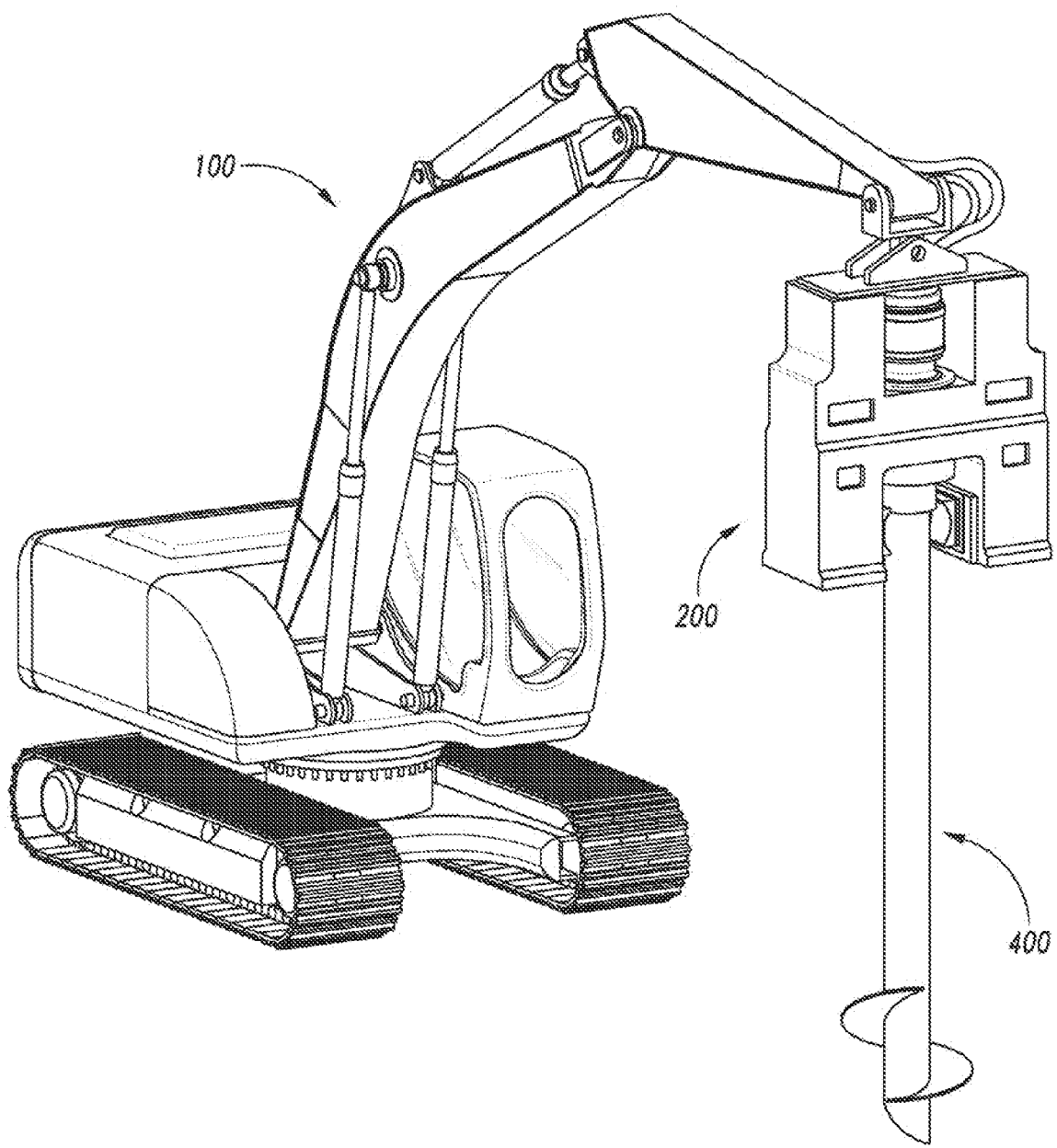
FIG. 1 illustrates a pile driver head suspended from an articulated boom attached to a movable base. A pile assembly is attached to and suspended from the driver head.

The present disclosure presents innovative apparatus and methods for installing pipe piling with or without the use of grout or similar material. A core innovation is the inclusion of an internal stop ring in the coupler, which prevents over-rotation of the pipe pile in the coupler that may strip threads and jeopardize the strength of the pipe to pipe connection. The internal stop ring is also used to seat a removable grout plug assembly that can seal the pile assembly to a tube or other mechanism that delivers the grout. In this manner, grout can be introduced into the pipe pile during the process of installing each pile segment, and under pressure, plugs can be pushed out to allow grout to mix with the earth on the exterior of the pipe piles. The stop ring preserves the integrity of the coupler to allow multiple uses while assuring appropriate load transfer through the joint.

As described herein, the disclosure includes drive shaft assembly for driving pipe piles that includes a rotary output shaft, a rotary output member and a rotary socket wrench attachment, each formed from a single unitary fitting or a combination of fittings. The rotary output shaft, rotary output member and rotary socket wrench attachment have a common axis of rotation. Rotation is transferred from the drive motor head to the rotary output shaft by means known to those of skill in the art, and as may be disclosed by U.S. Pat. No. 6,942,430, by way of non-limiting example. In some embodiments, rotation is transferred from the rotary output shaft to the rotary output member through splines, which may permit relative translation between the fittings. In other embodiments, power may be transferred by gear mechanisms or socket-and-wrench mechanisms as may be known in the art. In many cases, the rotary output member will comprise an external head for transferring rotation to a rotary socket wrench. In some cases, the head will be square or rectangular in shape. In other cases, the head may have more than four faces. In yet other cases, the head may include splines, threads, gears or other engagement mechanisms that are configured to match those in the rotary socket wrench attachment. In additional cases, the rotary socket wrench may be affixed to the rotary output member with fasteners.

In most embodiments, the rotary socket wrench attachment will include an axial socket comprising internal wrench flats that are configured to mate with the external ring of a coupler or an exterior flange on a pipe pile. The socket wrench attachment may have a socket that is formed by an annular wall. In some cases, the rotary socket wrench may include an upper end mounting flange, a lower end socket wrench, and a reduced diameter neck axially between the mounting flange and the socket wrench. An array of bolt fasteners surrounding the axis of rotation may radiate outwardly from the axial socket, and the fasteners may connecting the mounting flange of the socket wrench attachment to the rotary output member.

By way of non-limiting example, the socket disclosed in U.S. Pat. No. 7,950,876 may be used in connection with the present invention. In other cases, the bolt fasteners lie on a circle that is radially between the inner and outer surfaces of the socket wrench socket.

In some embodiments, the apparatus comprises a rotary output shaft, rotary output member and rotary socket wrench attachment with a support frame; a motor mounted on said support frame, said motor connected to said downwardly extending rotary output shaft; said rotary output shaft being connected to said rotary output member such that rotation of said output shaft by said motor will rotate the rotary output member about said vertical axis; said rotary output member being drivenly connectable a rotary socket wrench or the top of a pipe pile assembly at the upper end portion of the pipe piling; clamping apparatus mounted on side portions of the support frame, below said rotary output member, said clamping apparatus including: a pair of horizontally disposed linear hydraulic actuators, each said actuator comprising a fixed outer end portion and a retractable/extendible/rotatable inner end portion; and a pair of pipe piling engaging clamps connected to the inner end portions of the actuators, said clamps confronting each other across a space between them, said clamps being adapted to receive between them a section of pipe piling when the upper end portion of the pipe piling is drivenly connected to said rotary output member or rotary socket wrench; whereby the actuators can be retracted to move the clamps apart and provide between them said pipe piling receiving space, and the actuators can be extended to move the clamps towards each other and into clamping engagement with a pipe piling that has been placed in said space between the clamps. Such an apparatus is described, by way of non-limiting example, in U.S. Pat. No. 6,942,430.

In alternative embodiments, the motor drive head with rotary output shaft, rotary output member and rotary socket wrench attachment may be mounted on a carriage that may translate along a tower, including in the up and down direction. The tower may be portable and moved to places where pipe piling ground installation is desired.

In the alternative, the drive shaft assembly for driving pipe piles may include a vibratory output shaft, a vibratory output member and a vibratory socket wrench attachment for use with vibratory motors drives that install the pipe pile with axial vibratory force, such as that disclosed in U.S. Pat. No. 6,386,295 by way of non-limiting example.

In many embodiments, the invention is practiced with a hollow grout tube having a top and a bottom end. In many cases, the top may be removably attached to the output member. In a non-limiting example, the grout tube may be threaded into an opening in the output member having matching threads. In some cases, the bottom of the grout tube may be circular in cross-section. In other cases, the exterior of the bottom of the grout tube may be shaped to form a cross-section with four or more sides. In some cases, the cross-sectional shape is an octagon.

In most embodiments, the rotary output shaft, rotary output member, rotary socket wrench attachment, and grout tube are in axial alignment or have a common axis of rotation, with each having an opening along the axis such that a through opening is formed. Solids, liquids or combinations thereof may pass through the assembly, with or without the inclusion of a grout tube. In many cases, the rotary output shaft is further connected to a fitting at or near its top designed for the introduction of such solids, liquids or combinations thereof into the assembly. The grout fitting may be configured to accept a hose attachment through which material is pumped in through the drive mechanism and into the pipe pile. In other cases, a hose or tube may be passed through the drive mechanism, through the motor drive and into the pipe pile, with or without the grout fitting and/or grout tube. In most cases, a liquid or slurry is passed through at least the rotary output shaft, rotary output member, and rotary socket wrench attachment and into the pipe pile. For example, grout may be pumped through the grout fitting, rotary output shaft, rotary output member, rotary socket wrench attachment and grout tube into the pipe pile at any point during pipe pile installation. In a non-limiting alternative, grout or other material can be introduced through the drive shaft assembly via a tube that is snaked through assembly's openings and into the pipe pile assembly.

As described herein, a coupler of the present disclosure comprises a cylinder with an internal stop ring, wherein the internal stop ring divides an upper internally threaded portion from a lower unthreaded portion, and wherein the cylinder comprises an external ring configured to fit into a socket or a socket wrench attachment. In many cases, the internal stop ring is integral to the coupler. In other cases, the stop ring is a separate ring welded to the interior of the coupler. The threads in the first upper portion of the coupler may end before the upper edge of the coupler. In many cases, the threads end at least one-half inch before the top end of the cylinder. In other cases, the threads end one-half inch or less before the top end of the cylinder. In cases where the threads end before the end of the cylinder, the diameter of the unthreaded portion is greater than the threaded diameter. This increased diameter may facilitate the locating of a pipe pile end, or a fitting, into the top of the coupler prior to threading.

In many embodiments, the external ring has more than one edge. In some cases, the outer portion of the ring has four or more sides and may be square, hexagonal or octagonal, as non-limiting examples. The external ring may be configured to fit into the socket wrench attachment of a rotary or vibratory pipe pile driver.

As described herein, a pipe pile assembly of the disclosure comprises a coupler as disclosed herein and a pipe pile having a top end and a bottom end, where said top end is inserted into the lower, unthreaded portion of the coupler. The pipe pile may be welded to the coupler. The pipe pile may be a helical pile, i.e., comprising exterior helical flanges that assist in rotational installation of the pipe pile into the ground. The pipe pile may be painted or coated to facilitate installation, or to facilitate the introduction of grout or other material into the interior of the pipe pilings. Sealable ports may be included that permit the introduction of solids, liquids or combinations thereof into the pipe pile. The pipe pile may also have one or more holes along its length that may or may not be plugged. Non-limiting examples of plugs include cork or plastic bungs that may be pushed out of the hole, and out of the pile, into the ground.

In some embodiments, this assembly may be the bottom-most pile in a pipe piling column. In many cases, the pile may be closed-ended at the bottom. In other cases, the pile may include a removable plug at the end of the pile. In yet other cases, the pile may include an insert that includes a tip that may be pointed as disclosed hereafter. The plug or tip may be pushed out by mechanical means, or through the application of pressure from material introduced into the pipe pile, such as grout.

In many embodiments, the pipe pile assembly will comprise a second pile with a top and bottom. The bottom of the pile may be threaded to fit the upper threaded portion of the coupler. As with the first pipe pile, the second upper pile may be a helical pile, i.e., comprising exterior helical flanges that assist in rotational installation of the pipe pile into the ground.

The pipe pile may be painted or coated to facilitate installation, or to facilitate the introduction of grout or other material into the interior of the pipe pilings. Sealable ports may be included that permit the introduction of solids, liquids or combinations thereof into the pipe pile. The pipe pile may also have one or more holes along its length that may or may not be plugged. Non-limiting examples of plugs include cork or plastic bungs that may be pushed out of the hole, and out of the pile, into the ground.

As described herein, a pipe pile assembly of the disclosure comprises a coupler as disclosed herein and a pipe pile having a top end and a bottom end, where said top end is inserted into the lower, unthreaded portion of the coupler. The pipe pile may be welded to the coupler. The pipe pile may be a helical pile, i.e., comprising exterior helical flanges that assist in rotational installation of the pipe pile into the ground. The pipe pile may be painted or coated to facilitate installation, or to facilitate the introduction of grout or other material into the interior of the pipe pilings. Sealable ports may be included that permit the introduction of solids, liquids or combinations thereof into the pipe pile. The pipe pile may also have one or more holes along its length that may or may not be plugged. Non-limiting examples of plugs include cork or plastic bungs that may be pushed out of the hole, and out of the pile, into the ground. The pipe pile is an open-ended, bottommost pile in a pipe piling column, and the assembly comprises a removable tip insert that is disposed in the bottom end of the pile. In many embodiments, the tip insert includes a rod that is joined to the tip insert, with the rod extending upwards in the pipe pile.

In many cases, such a bottommost pipe pile assembly will further comprise a second pile with a top and bottom. The bottom of the pile may be threaded to fit the upper threaded portion of the coupler. As with the first pipe pile, the second upper pile may be a helical pile, i.e., comprising exterior helical flanges that assist in rotational installation of the pipe pile into the ground. The pipe pile may be painted or coated to facilitate installation, or to facilitate the introduction of grout or other material into the interior of the pipe pilings. Sealable ports may be included that permit the introduction of solids, liquids or combinations thereof into the pipe pile. The pipe pile may also have one or more holes along its length that may or may not be plugged. Non-limiting examples of plugs include cork or plastic bungs that may be pushed out of the hole, and out of the pile, into the ground.

In some embodiments, the coupler in the assembly will comprise an internal stop ring and external ring as disclosed herein. In other embodiments, the coupler will not include an internal stop ring.

In many embodiments, a disk-shaped centralizer will be transversely inserted into the coupler and held in place by friction, such as created by a chamfered edge matching the internal wall of the coupler, or held in place against the internal stop ring as a spacer underneath the end of the upper pile. In the alternative, the centralizer may be welded or threaded into the coupler. The centralizer has one or more openings, with at least one opening configured to permit translation of the rod sections through the opening. The opening, and the connector for the rod sections, may be any shape. By way of non-limiting example, both the opening in the centralizer and the cross-sectional shape of the connector may be hexagonal.

In many cases, the rod section of the tip insert will be joined with a second rod section with a connector. The connector and rod sections may be threaded. The rod sections and connector are configured to pass through at least one opening of the centralizer so that the tip insert may be pushed downward and out of the pipe pile by applying force to the rod section. As each successive pipe section is installed, a sleeve may be used to guide installation of a rod section into the connector. The topmost rod may be held in place with a holder comprising a stem that is configured to mate with a connector and a cap configured to seat the holder inside the pipe pile. The holder is configured to sit in the pipe pile proximate to the top end to keep the rod sections in place as each pipe pile is driven into the ground.

In some embodiments, the bottom end of the first pile may include one or more receiving plates disposed transversely therein. In many cases, two plates will be disposed proximate the bottom of the pile. In some cases, the plates will be welded in place. In other cases, the plates will be held in place by internal weld beads or rings affixed to the interior of the pipe pile. The plates comprise openings that permit the insertion of a cylinder or a rectangular prism.

In many embodiments, the tip insert comprises a rectangular prism with an upper end a lower end. The prism may be removably inserted into the receiving plates at the end of the pile, said receiving plates having openings that accept translation of the tip insert in the pipe pile. In many cases, the lower face of the prism is fixed to a plate that fits within the pipe pile opening, but of the same general shape and size of the first receiving plate. The first receiving plate may be fixed within the pipe pile a distance from the end of the pile so that, when the tip insert is place in the pile, the plate of the tip insert creates a flush face with the bottom edge of the pipe pile. In other cases, the tip insert comprises an external point that extends below bottom of the pipe pile when the tip is fully inserted into the pipe pile. In yet other cases, a rod section is joined to the top of the prism or cylinder of the tip insert and extends upwards into the pipe pile assembly.

As described herein, a grout plug assembly of the disclosure comprises an assembly that threads into the upper threaded portion of the coupler of the disclosure. In many cases, the grout plug assembly includes an externally threaded sleeve and a disk-shaped spacer affixed thereto. Both the sleeve and the spacer have aligned axial openings, however, the openings need not be the same size, shape or diameter. For example, the threaded sleeve may have a larger internal diameter so that one or more additional sleeves may be inserted into the threaded sleeve. The additional sleeves and the spacer have aligned axial openings; however, the openings need not be the same size, shape or diameter. The assembly may be practiced with one or more seal rings disposed on the interior diameter of the threaded sleeve or other internal sleeves.

In many embodiments, the spacer is designed to be rotated with the application of a rotation force through its opening. In many cases, the spacer comprises an opening with four or more sides. In some such instances, the opening is octagonal. Upon insertion of a similarly shaped tool, the grout plug assembly can be removably threaded into the coupler through application of rotational force to the spacer.

In other embodiments, the internal diameters of the sleeve, and the shape of the spacer opening, are configured to accept and mate with the dimensions of the grout tube of the present disclosure. Thus a pile assembly comprising the disclosed grout plug assembly may be fitted to a drive mechanism comprising a grout tube removably attached to the output member so that material may be passed through the motor drive head and into the pipe piling in a closed or a relatively closed system.

The above embodiments may be practiced with methods as disclosed herein. A method of the present disclosure includes driving a pile assembly as disclosed herein using the drivers disclosed herein or in U.S. Pat. No. 6,386,295 or 6,942,430. As each pipe pile section is driven, the pipe pile assembly may be disengaged from the socket wrench attachment and the next section may be attached thereto. Such additional pile assemblies may be threaded into the coupler and the extended pipe pile assembly is driven and so forth until the target depth or length of pipe pile is achieved.

In many embodiments, the method may include the use of a tip insert and specially configured bottommost pile, as disclosed herein. Once the target depth or length of pipe pile is achieved, the pile assembly may be backed up and grout introduced. The tip may be pushed out with application of force to the rod section, either before or after introducing the grout. The pile assembly is driven back to its desired position, allowing grout to mix with the ground outside of the pipe pile. In other cases, the lower end of the bottommost pile is closed, and the grout pushes out of the pile assembly after the holes therein are unplugged by the force of the grout.

In other embodiments, the method further comprises inserting a grout plug assembly into the coupler of a pipe pile assembly before driving said assembly. Grout may be introduced through the grout tube before, during, or after driving the assembly, after which the pipe pile assembly may be disengaged from the socket wrench attachment and the grout plug assembly removed. The next pile assembly, with grout plug assembly, may be attached to the socket wrench attachment and driven. The steps may be repeated until the target depth or length of pile is reached.

In many cases, grout is introduced through the drive mechanism of the present disclosure. In other embodiments, grout can be introduced through the ports on the pipe piles, which are subsequently sealed. In yet other embodiments, grout can be introduced through a tube that passes down the pipe pile assembly, and optionally passing through the drive mechanism of the present disclosure. Of course, the pipe pile assembly may be driven up and down during the process to facilitate introduction of the grout. Furthermore, the grout may be introduced before, during, or after the driving of any given pipe pile.

Having now generally provided the disclosure, the same will be more readily understood through reference to the following examples which are provided by way of illustration, and are not intended to be limiting of the disclosure, unless specified.

EXAMPLES

Example 1

Referring to FIG. 1, a drive motor contained within motor casing 200 is suspended from movable boom 100. Pile assembly 400 is attached to and suspended from the drive motor. Exemplars of the movable boom 100 and motor casing 200, together with a detailed description of the drive motors of the present invention, can be found in U.S. Pat. No. 6,386,295 or 6,942,430, which are incorporated herein by reference. The drive motor assembly 210 may, in the alternative, be attached to carriage that may be movable up and down along a portable tower. Particulars of an exemplary movable tower and carriage can be found in U.S. Pat. No. 7,950,876, which is incorporated herein by reference.

Figure 2:
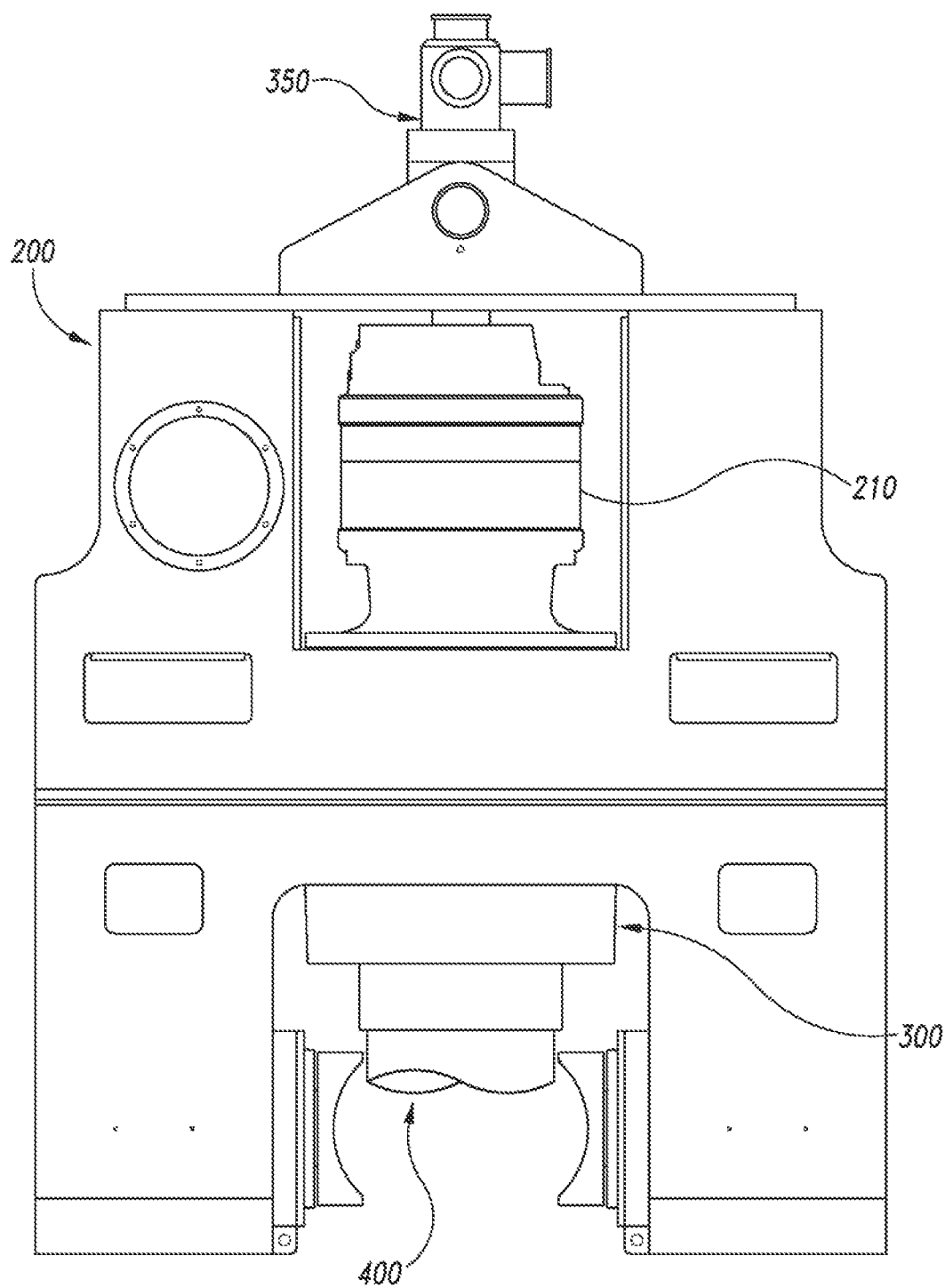
FIG. 2 illustrates the driver head that includes a motor and drive shaft assembly encased in the pile driver casing. A portion of the attached pile assembly is shown attached to the rotary socket wrench attachment.

Referring to FIG. 2, a motor casing 200 is shown in more detail enclosing a drive motor and drive shaft assembly 300. An optional grout fitting 350 can be attached to the top of the drive shaft mechanism. Grout or other material may be pumped through grout fitting 350 and through drive shaft assembly 300 into pipe pile assembly 400 before, during or after the pipe pile assembly is driven into the ground.

Example 2

Figures 3, 4:
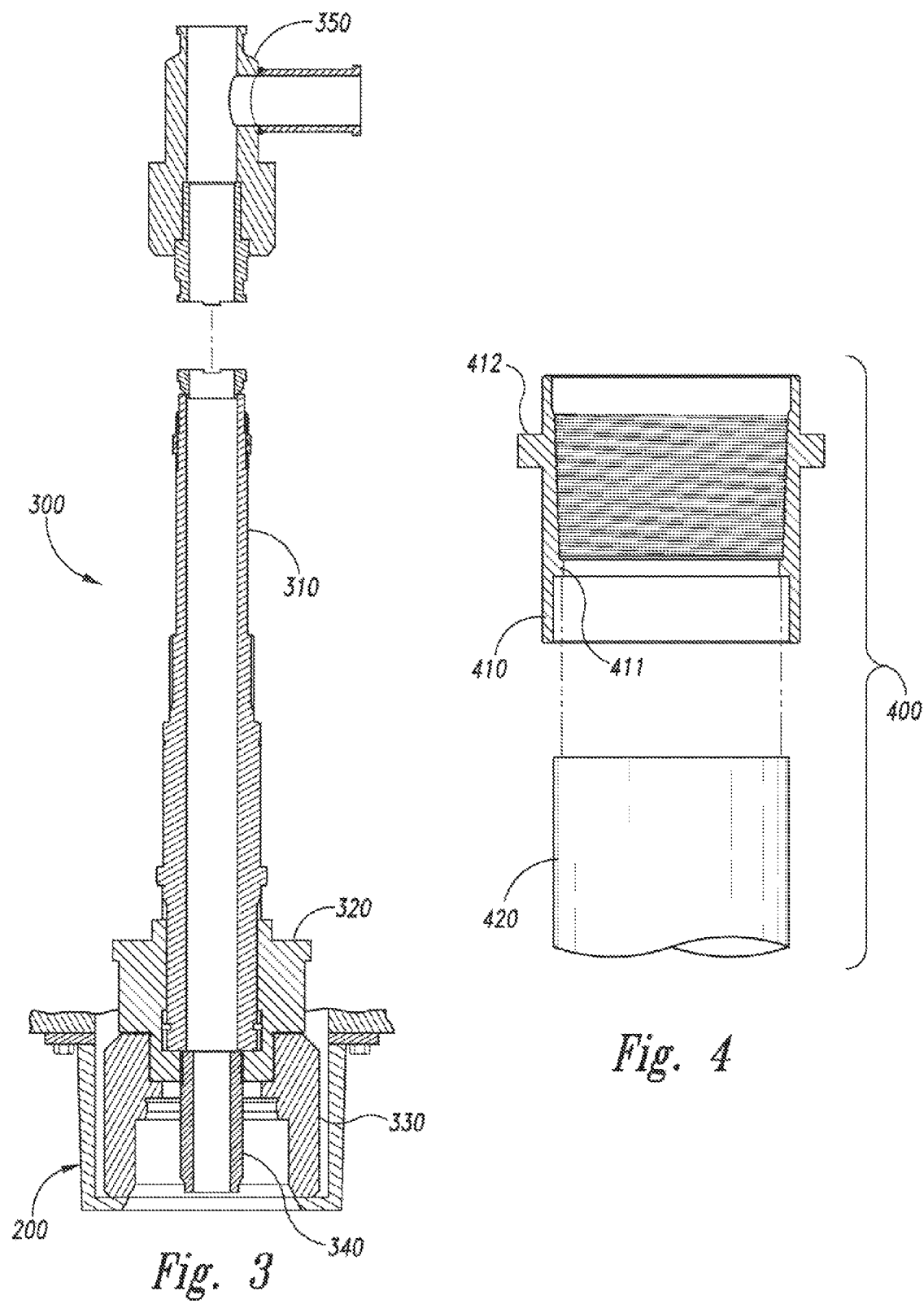
FIG. 3 shows a section of the drive shaft assembly removed from the pile driver. A portion of the pile driver casing is shown.
FIG. 4 is an exploded view of the coupler and the top of a pipe pile.

Referring to FIG. 3 and FIG. 8, a drive shaft assembly 300 is shown in cross section as separated from drive motor assembly 210 contained in motor casing 200. Rotary output shaft 310 transfers rotation from the drive motor to rotary output member 320 through matching splines 321. Rotary output member 320 includes a square-shaped external head that in turn drives rotary socket wrench attachment 330, which includes octagonal socket wrench flats designed to mate with pile assembly 400. Grout fitting 350 is connected near the top of the rotary output shaft 310. The openings in grout fitting 350, rotary output shaft 310, rotary output member 320 and rotary socket wrench attachment 330 are sufficiently large in size to permit a liquid or slurry such as grout to be pumped through the assembly.

The inner diameter of the external head portion of rotary output member 320 may include threads 322 that accept removable grout tube 340. Grout tube 340 also has an opening sufficiently large in size to permit a liquid or slurry such as grout to be pumped through the assembly when installed into rotary output member 320. Grout tube 340 has a lower end that is designed to fit into grout plug assembly 500 when connected.

Example 3

Figure 9A:
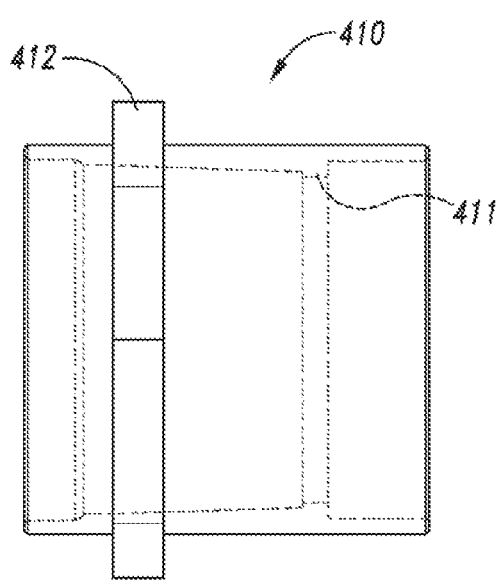
FIGS. 9A and 9B show the coupler.
Figure 9B:
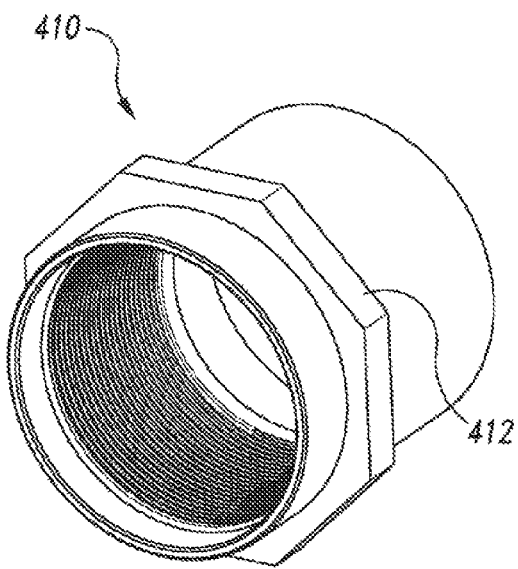

Referring to FIG. 4, FIG. 9A and FIG. 9B, pipe pile assembly 400 includes coupler 410 and helical pipe pile 420. The top end of helical pipe pile 420 may be welded to the lower unthreaded portion of coupler 410. Coupler 410 includes internal stop ring 411 and external wrench flats 412.

Figure 5A:
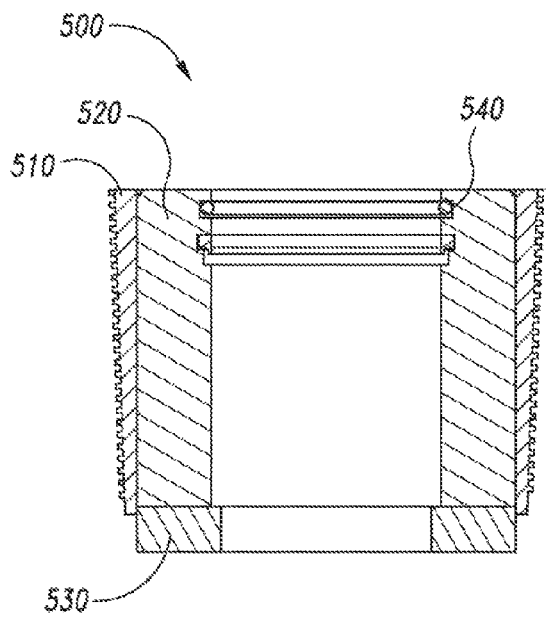
FIGS. 5A and 5B illustrate the grout plug assembly.
Figure 5B:
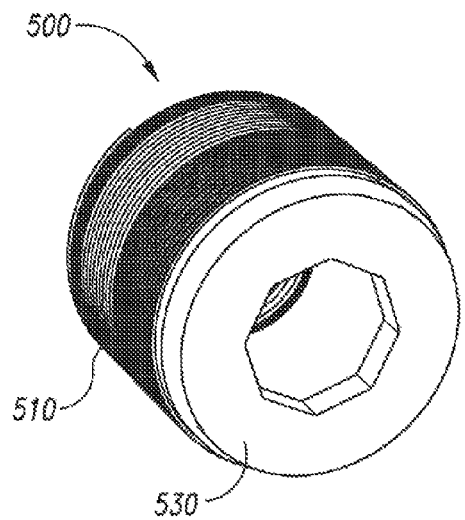

Referring to FIG. 5A and 5B, grout plug assembly 500 is illustrated. The assembly may include threaded sleeve 510, the threads of which designed to thread into the upper threaded portion of coupler 410. Grout plug assembly 500 may further include sleeve 520 and spacer 530. Sleeve 520 may comprise one or more sleeve sections. The sleeve may also include recesses for O-ring seals 540. Referring to FIG. 7, the central openings of the sleeves of grout plug assembly 500 are designed to allow grout tube 340 to fit through both sleeve 520 and spacer 530. Referring to FIG. 5B, the opening in spacer 530 may be octagonal in shape.

Figure 6:
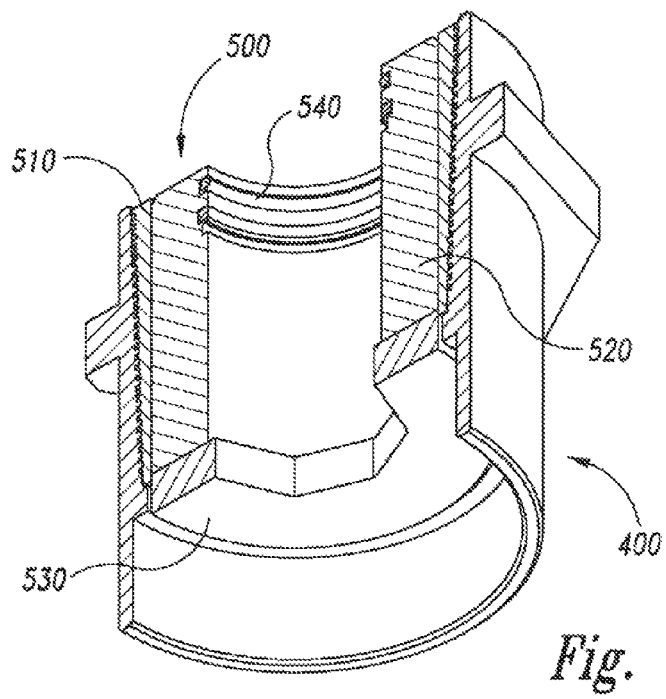
FIG. 6 shows a section of the grout plug assembly as inserted into a coupler. The pipe pile is not shown.

Referring to FIG. 6, using an octagonal shaped tool, grout plug assembly 500 may be inserted and removed from coupler 410 by hand or by mechanical means. Internal stop ring 411 may be used to prevent over threading insertion. Of course, different shapes of opening and tools are contemplated in the present disclosure.

Example 4

Referring to FIG. 7 and FIG. 8, grout plug assembly 500 may be inserted into pipe pile assembly 400 with the use of hand tool. Pipe pile assembly 400 is then fitted to the drive shaft assembly 300, which includes grout tube 340. Grout tube 340 fits into the grout plug assembly 500. The external ring 412 is drivenly connected to internal wrench flats of rotary socket wrench 330. Grout is introduced through the openings in the drive shaft assembly 300 into pipe pile assembly 400 in a sealed environment, after which the pipe pile assembly 400 is disengaged from the drive motor and grout plug assembly 500 is removed.

Example 5

Figure 10A:
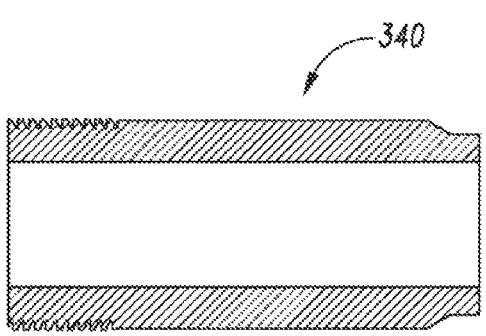
FIGS. 10A and 10B illustrate the grout tube.
Figure 10B:
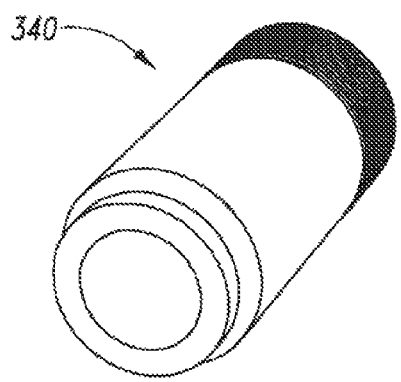

Referring to FIGS. 10A and 10B, grout tube 340 has an upper threaded end and a lower end. The upper threaded end may be threaded into threads 322 of rotary output member 320. The lower end may be configured in any shape that fits the opening in spacer 530 of grout assembly 500.

Example 6

Referring to FIG. 11 and FIG. 12, pile assembly 700 includes helical pile 710 having internal receiving plates 720. Receiving plates 720 may be welded into helical pile 710. Tip insert assembly 600 includes a prism 610 attached to lower plate 620 and a point 630. Rod section 640 is also attached to prism 610 and extends upward into helical pile 710.

Figure 15:
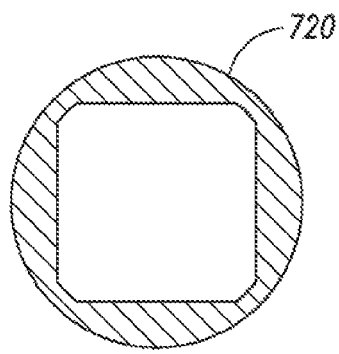
FIG. 15 illustrates a detail used in connection with the pipe pile that accepts a tip insert.

The cross-section of prism 610 is designed to fit into the openings of receiving plates 720 such as those illustrated in FIG. 15. Of course, the prism may have three or more sides, or may be substituted with a cylinder. Lower plate 620 is designed to snugly into the inner diameter of helical pile 710, and this feature along with the location of receiving plate 720 are designed to create a flush end as shown in FIG. 12. Receiving plates 720 prevent rotational movement as pile assembly 700 is driven to the target depth.

Example 7

Figure 13:
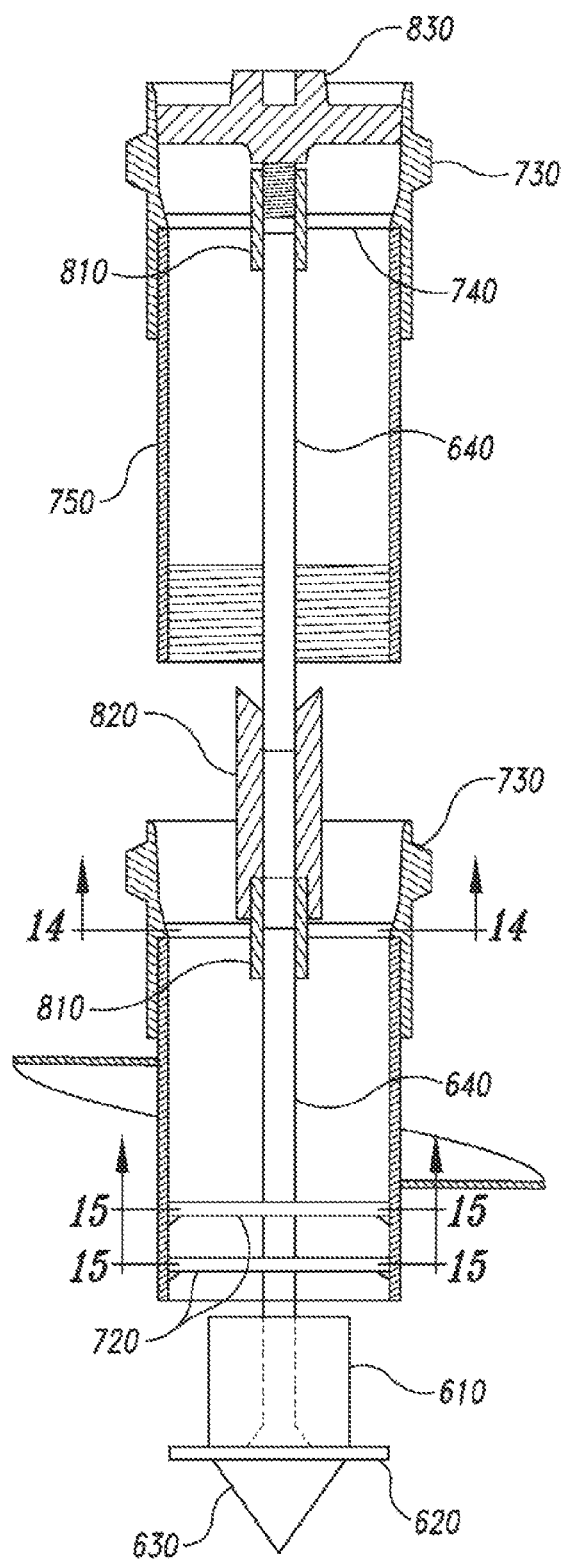
FIG. 13 shows the tip insert and rod section assemblies.
Figure 14:
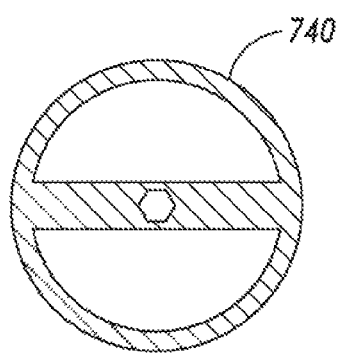
FIG. 14 illustrates a detail used in connection with a rod assembly.

Referring to FIG. 13 and FIG. 14, pile assembly 700 optionally includes centralizer 740 and holder 830. Furthermore, rod sections 640 may be optionally joined by connector 810, which may be optionally threaded. Rod sections 640 can be introduced to connector 810 through sleeve 820.

Example 8

Grout assembly 500 is threaded into coupler 410 of pipe assembly 400 by turning spacer 530. A rotary drive motor such as disclosed in U.S. Pat. No. 6,942,430 is provided with rotary output shaft 310, rotary output member 320, rotary socket wrench attachment 330, grout tube 340, and grout fitting 350. External ring 412 of pipe assembly 400 with grout assembly 500 is engaged to rotary socket wrench attachment 330. Movable boom 100 raises the drive motor 210 and the pipe assembly 400 until the lower end of pipe assembly 400 can be threaded into coupler 410 of the pile assembly already driving into the ground. Pipe assembly 400 is driven into the ground. Grout is pumped through grout fitting 350 into pipe assembly 400. Pipe assembly 400 is disengaged from rotary socket wrench attachment 330. Grout assembly 500 is removed from coupler 410 of pipe assembly 400 by turning spacer 530 in the opposite direction, and the next pipe assembly segment may be threaded into driven coupler 410.

All references cited herein, including patents, patent applications, and publications, are hereby incorporated by reference in their entireties, whether previously specifically incorporated or not.

Having now fully described the inventive subject matter, it will be appreciated by those skilled in the art that the same can be performed within a wide range of equivalent parameters, concentrations, and conditions without departing from the spirit and scope of the disclosure and without undue experimentation.

While this disclosure has been described in connection with specific embodiments thereof, it will be understood that it is capable of further modifications. This application is intended to cover any variations, uses, or adaptations of the disclosure following, in general, the principles of the disclosure and including such departures from the present disclosure as come within known or customary practice within the art to which the disclosure pertains and as may be applied to the essential features hereinbefore set forth.

What is claimed is:

1. A pipe pile assembly comprising:
   At least one pipe pile, each pipe pile having an interior having an inner diameter, a bottom end and a top end, the at least one pipe pile comprising a first pipe pile;
   A tip insert movably disposed proximate the bottom end of the first pipe pile and having a flush mode and a pushed-out mode, the tip insert comprising: a prism with an upper end and a lower end and having a transverse cross-section with at least three sides;
   A lower plate fixed to the lower end of the prism, the lower plate is configured to fit snugly into the inner diameter of the bottom end of the first pipe pile; and
   A point that protrudes below the lower plate;
   At least one rod section, the at least one rod section comprising a first rod section disposed within the interior of the first pipe pile, wherein the first rod section is joined to the tip insert; and
   A first receiving plate attached transversely within the interior of the first pipe pile proximate to the bottom end of the first pipe pile, the first receiving plate having a tip insert receiving opening configured to receive a portion of the prism and permitting axial translation of the prism and inhibiting the rotation of the prism within the tip insert receiving opening;
   Wherein the tip insert is in the flush mode when the lower plate is disposed against the first receiving plate forming a flush end with the bottom end of the first pipe pile; and
   Wherein the tip insert is moved to the pushed-out mode such that the prism is spaced from the tip insert receiving opening by at least one of mechanical means and introducing material under pressure into the interior of the first pipe pile.

2. The assembly of claim 1, further comprising:
   at least one coupler for connecting together pipe piles; and
   at least one connector for connecting together rod sections.

3. The assembly of claim 1, further comprising a disc-shaped centralizer having at least one opening, the at least one opening comprises a configuration for receiving and permitting a portion of one of said at least one rod sections to translate through the at least one opening.

4. The assembly of claim 1, further comprising a second receiving plate disposed transversely within said first pipe pile and spaced from the first receiving plate.

5. The assembly of claim 1, wherein the transverse cross-section of the prism is rectangular.

6. The assembly of claim 1, further comprising a holder comprising a stem configured to mate with a cap configured to seat said holder inside and proximate to the top end of at least one of said pipe piles.

7. The assembly of claim 3, wherein the at least one opening in the centralizer is hexagonal for receiving in a pass-through engagement a mating connector having a hexagonal external configuration.

8. The assembly claim 1, wherein said assembly further comprises grout disposed in one of the at least one pipe piles.

9. The assembly of claim 1, wherein said assembly further comprises a sleeve for guiding one of the at least one rod sections into a connector.

10. The assembly of claim 1, wherein one of the at least one rod sections is threaded.

11. The assembly of claim 1, wherein one of the at least one pipe piles further comprises a sealable port for introducing material into the one of the at least one pipe piles.

12. The assembly of claim 1, wherein the tip insert is moved to the pushed-out mode mechanically using the rod sections.

13. The assembly of claim 1, wherein the tip insert is moved to the pushed-out mode mechanically using the rod sections during the introduction of material under pressure into the interior of the pipe piles of the pipe pile assembly.

14. The assembly of claim 1, wherein the tip insert is moved to the pushed-out mode by introducing material under pressure during the driving the pipe pile assembly into the ground.

15. The assembly of claim 1, wherein material introduced under pressure is grout.

* * * * *